(12) United States Patent
DiVincenzo et al.

(10) Patent No.: US 12,218,954 B2
(45) Date of Patent: *Feb. 4, 2025

(54) SYSTEMS AND METHODS FOR CONTEXTUALLY SECURING REMOTE FUNCTION CALLS

(71) Applicant: Impart Security Inc., Coral Gables, FL (US)

(72) Inventors: Jonathan DiVincenzo, Miami, FL (US); Marc Harrison, Seattle, WA (US); Brian Joe, Irvine, CA (US)

(73) Assignee: Impart Security Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,698

(22) Filed: Mar. 18, 2024

(65) Prior Publication Data
US 2024/0223573 A1 Jul. 4, 2024

Related U.S. Application Data

(63) Continuation of application No. 17/695,987, filed on Mar. 16, 2022, now Pat. No. 11,968,218.

(51) Int. Cl.
*H04L 9/40* (2022.01)
(52) U.S. Cl.
CPC ...... *H04L 63/1408* (2013.01); *H04L 63/1441* (2013.01)

(58) Field of Classification Search
CPC .............. H04L 63/1408; H04L 63/1441
See application file for complete search history.

(56) References Cited

U.S. PATENT DOCUMENTS

| | | | | |
|---|---|---|---|---|
| 9,438,618 | B1 * | 9/2016 | Sultan | G06F 21/53 |
| 9,516,053 | B1 * | 12/2016 | Muddu | G06F 16/9024 |
| 11,050,765 | B2 * | 6/2021 | Lin | G06F 21/53 |
| 11,277,437 | B1 * | 3/2022 | Burgis | H04L 63/1408 |
| 2017/0243028 | A1 * | 8/2017 | LaFever | G06F 21/6254 |
| 2019/0020665 | A1 * | 1/2019 | Surcouf | H04L 9/3236 |
| 2019/0068622 | A1 * | 2/2019 | Lin | H04L 63/1441 |
| 2021/0029165 | A1 * | 1/2021 | Fitz-Gerald, Jr. | G06F 21/562 |

* cited by examiner

*Primary Examiner* — Cheng-Feng Huang
(74) *Attorney, Agent, or Firm* — Ansari Katiraei LLP; Arman Katiraei; Sadiq Ansari

(57) ABSTRACT

Disclosed is a system for customizing protections provided to different application programming interfaces ("APIs") and different functions of an API based on different API context and user context associated with the different APIs and the different functions of each API. The system receives a particular API, determines API context for proper usage of one or more functions of the particular API, and determines user context associated with endpoints properly accessing the one or more functions. The system generates a model for differentiating between proper and improper use of the one or more functions based on contextual relationships between different combinations of the API context and the user context. The system monitors usage of the one or more functions based on the model, and performs an action that is associated with the model in response to the usage violating the contextual relationships for the one or more functions.

20 Claims, 9 Drawing Sheets

SYSTEMS AND METHODS FOR CONTEXTUALLY SECURING REMOTE FUNCTION CALLS

CLAIM OF BENEFIT TO RELATED APPLICATIONS

This application is a continuation of U.S. nonprovisional application Ser. No. 17/695,987 with the title "Systems and Methods for Contextually Securing Remote Function Calls", filed Mar. 16, 2022. The contents of application Ser. No. 17/695,987 are hereby incorporated by reference.

BACKGROUND

Security for network accessed content has focused on preventing malicious content and volumetric attacks. For instance, a firewall may detect Structured Query Language ("SQL") injection attacks, phishing, penetration or vulnerability queries, content generated by botnets, and/or requests containing viruses, malware, and/or other malicious content. Similarly, the firewall may detect a volumetric attack based on a rate of requests issued by one or more devices, or a rate of requests targeting specific content or endpoints.

Application programming interfaces ("APIs") are, however, susceptible to different types of attacks and/or misuse. For instance, valid remote function calls, that do not contain malicious content and that are not part of a volumetric attack, may be used to perpetrate an API attack or misuse the API. The valid remote function calls may be used to misappropriate data from a misconfigured API. Specifically, an API may return too much data or private data in response to valid calls when the API or its function calls are misconfigured. Firewalls are unable to protect the API from these types or attacks or misuse, and in some cases may block valid API usage. For instance, certain API functions may be called more frequently than other functions, and/or certain endpoints may call a particular API function more than other endpoints. These valid uses of the API may trigger rate limiting rules of the firewall, and may cause the firewall to incorrectly block valid API traffic. Accordingly, existing firewalls may provide inadequate protection of remotely accessed APIs.

DETAILED DESCRIPTION OF PREFERRED EMBODIMENTS

Figure 1:
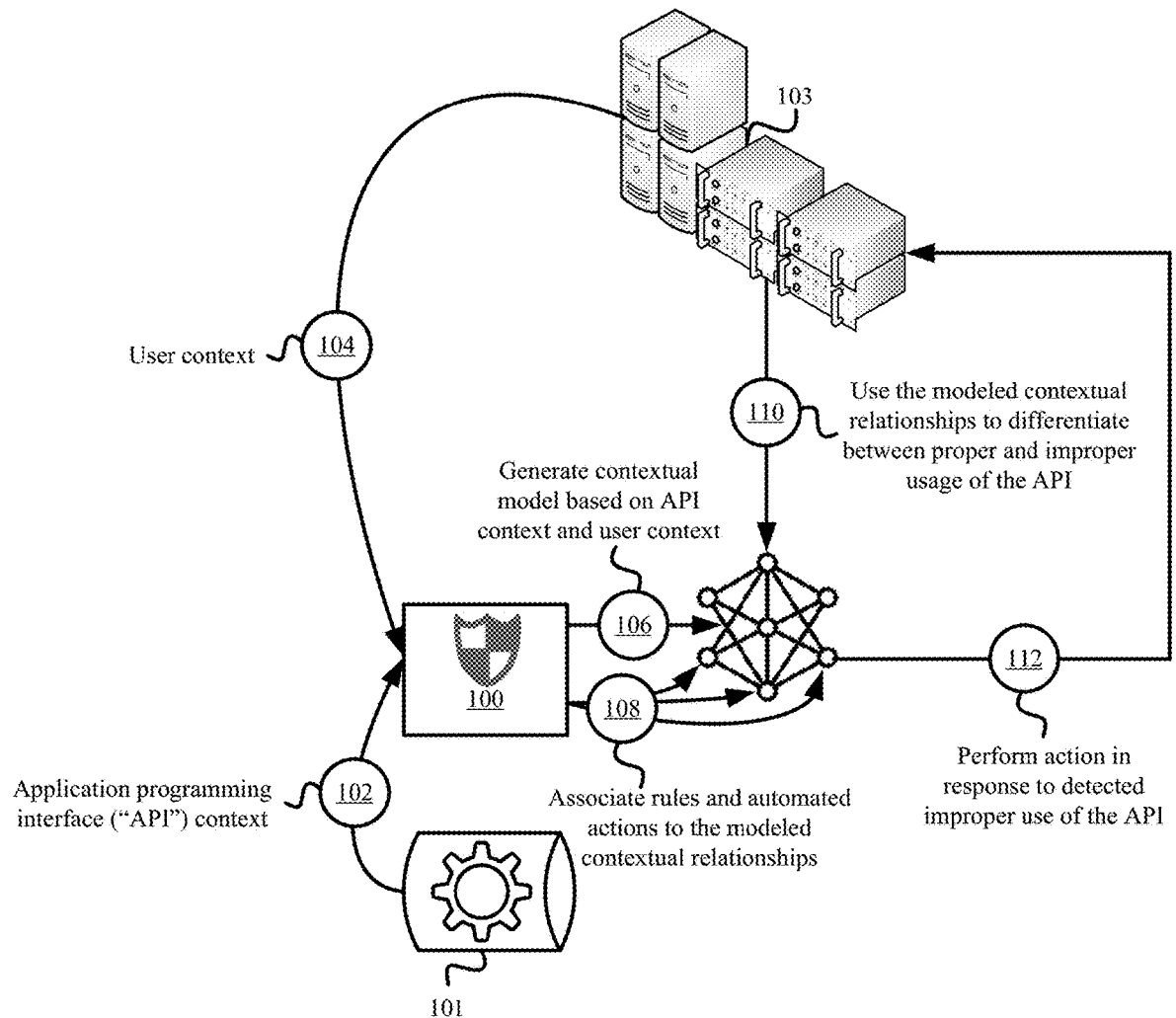
FIG. 1 illustrates an example of developing contextual relationships from which to implement application programming interface ("API") specific protections in accordance with some embodiments presented herein.

The following detailed description refers to the accompanying drawings. The same reference numbers in different drawings may identify the same or similar elements.

Provided are systems and methods for contextually securing function calls of different remotely accessed application programming interfaces ("APIs"). The systems and methods may provide an API security system that detects and protects against API misuse or attacks that may be unique on an individual API basis based on unique contextual relationships that are modeled for each API and different actions that are associated with each contextual relationship. In other words, the systems and methods do not use a static set of rules or policies to secure different APIs or even different functions of the same API. Instead, the systems and methods may develop customized rules or policies based on unique contextual relationships that are established for each function of each API.

In some embodiments, the API security system may compile a first set of API context to model the intended usage of a particular API and/or individual functions of the particular API. The API security system may compile the first set of API context from the particular API developers, scanning of the particular API source code, usage criteria associated with different function calls of the particular API, and/or other sources.

In some embodiments, the API security system may compile a second set of user context to model the intent of different endpoints accessing or calling the particular API functions. The API security system may compile the second set of user context based on tracked usage of the particular API functions, identification of endpoints that are expected and/or authorized to access specific functions of the particular API, and/or other identified behavior associated with different endpoints accessing or calling the particular API functions.

The API security system may generate a contextual relationship model to identify different combinations of the first set of API context and the second set of user context for proper or improper uses of the particular API that are unique to that particular API. Specifically, the API security system may model different combinations of API context and user context to determine if the intended use of the particular API functions by one or more endpoints matches or deviates from the intended use defined for the particular API functions by the API creators or the API provider.

The API security system may associate policies or rules to the modeled contextual relationship combinations. Each policy or rule may implement an automated action in response to improper use of the particular API that is detected using a modeled combination of API and user context.

In some embodiments, the API security system may operate in the "cloud" and remote from the particular API and/or other APIs that are secured by the API security system. The interfaces to the particular API and/or other APIs may be configured to provide a copy of each API call and API response to the API security system, and may be configured to allow the API security system to activate and/or enforce various rules and attack protections at the interfaces. In some such embodiments, the API security system may compile the first set of API context and the second set of user context for different APIs and/or from endpoints accessing each of the different APIs in order to improve the contextual relationship modeling. Specifically, the API security system may combine the contextual data from the various sources to obtain a larger set of API context and user context from which to train the contextual relationship models for each API. The API security system may generate unique contextual relationship models for each API based on the combined contextual data from the various sources and may bias the contextual relationship model for each particular API to giving greater weights to the API context and user context that is specific to that particular API.

FIG. 1 illustrates an example of developing contextual relationships from which to implement API-specific protections in accordance with some embodiments presented herein. As shown in FIG. 1, API security system 100 may obtain (at 102) API context for API 101. API security system 100 may obtain (at 102) the API context from the developers and/or creators of API 101, one or more repositories storing the source code of API 101, API 101 usage logs, artificial intelligence or machine learning ("AI/ML") techniques, and/or other sources that contain additional context for API 101. The developers and/or creators may enumerate the API context in one or more text files, API configuration files, and/or usage manuals.

The API context may include information on the intended use of API 101 and/or the functions of API 101. More specifically, the API context may identify the parameters or formatting for properly calling the API functions (e.g., functions of API 101), different services, entities, or types of services or entities that may call different API functions, operations performed by each API function, output that is expected from each API function, expected resource (e.g., processor, memory, storage, network bandwidth, etc.) usage by each API function, permissible input and output data associated with each API function, permissible sizes of requests or calls made to different functions, permissible response sizes for different called functions, API function interrelationships including sequences by which different sets of API functions are commonly accessed (e.g., expected usage patterns of the particular API), expected frequency with which different API functions are called, other metrics or usage statistics relating to the API functions, other expected usage or access behavior of the API functions, and/or other intended usage associated with the API functions.

API security system 100 may also obtain (at 104) different user context for endpoints 103 that access or call functions of API 101 and/or other APIs that are secured or protected by API security system 100. API security system 100 may obtain (at 104) the user context from the developers and/or creators of API 101, configuration files, the API logs, a mapping of endpoint 103 network addresses to user context that is stored or tracked for each endpoint 103, tracked endpoint 103 behavior, and/or other sources of the user context.

The user context may include information on the intent of each user, device, or endpoint 103 that access API 101 and/or that calls one or more of the API functions. The user context may identify the intent of an endpoint 103 by identifying who the endpoint is (e.g., affiliate, partner, customer, service provider, etc.), how the endpoint is accessing API 101 (e.g., subscriber, free user, and/or entity that accesses the particular API for one of several enumerated uses), what functions or types of functions the endpoint is expected or permitted to call (e.g., functions that access financial information, inventory, various databases, etc.), the device type (e.g., server, user mobile device, user static device, etc.), frequency of endpoint access (e.g., number of times the endpoint is expected to call different functions), other metrics or usage statistics relating to endpoint API access behavior, and/or other data from which the intent of endpoints 103 may be determined.

API security system 100 may generate (at 106) a contextual relationship model based on the obtained (at 102) API context and the obtained (at 104) user context. In some embodiments, API security system 100 may use a neural network and/or other AI/ML techniques to determine combinations of API context and user context that accurately model proper and/or improper use of API 101 and/or a severity associated with different improper uses of API 101. More specifically, generating (at 106) the contextual relationship model may include determining one or more API context that identifies proper usage of a particular function of API 101, and one or more user context that pairs with the one or more API context to identify endpoints 103 that adhere to or deviate from the proper usage. For instance, specific API context may identify a particular API function that may be called by a payment processing endpoint because the particular API function exposes private customer data. API security system 100 may identify and create a relationship between the specific API context and one or more user context that differentiates the payment processing endpoints 103 from other endpoints 103. For instance, user context that provides an endpoint location and/or a function call frequency of an endpoint may not be used to create a contextual relationship model with the specific API context. Instead, API security system 100 may create a contextual relationship model between the specific API context and user context that identifies services provided by endpoints 103 and/or Payment Card Industry Data Security Standard ("PCI DSS") and/or other accreditations of endpoints 103. The contextual relationship model may include multiple pairings or linkages between different API context and user context to more accurately differentiate between the proper and improper uses of each function. For instance, the contextual relationship model may include a first API context for providing a payment processing endpoint access to a first function and a first user context that differentiates the payment processing endpoints from other endpoints 103, and a second API context for calling the first function only after a second function has been called and a second user context that identifies a frequency with which an endpoint calls the first and second functions or tracks a state of function calls made by an endpoint. Accordingly, API security system 100 may generate (at 106) a complex multi-contextual relationship model to better differentiate a proper and correct use of API 101 from an improper use of API 101 and/or an attack directed to assume control, take down, inject malicious content, misappropriate data, and/or otherwise compromise operation of API 101. In other words, the contextual relationship modeling may include determining different relationships between the API context and the user context that may be used to accurately detect if endpoints 103 are properly or improperly calling and/or accessing different functions of API 101, and/or whether the function calls by endpoints 103 constitute an attack or intended use of API 101 for permitted or acceptable purposes.

API security system 100 may associate (at 108) different policies or rules to each modeled contextual relationship based on the accuracy with which the modeled contextual relationship indicates proper or improper use and/or based on the severity of the improper use modeled by each contextual relationship. Each policy or rule may be defined with one or more automated actions that API security system 100 may perform upon detecting a modeled contextual relationship of improper use by endpoints 103 accessing API 101. The automated actions may include blocking access, redirecting access, limiting access, rewriting requests, flagging source code or function calls, and/or providing notifications to developers, security personnel, and/or other entities of suspected misuse of specific functions of API 101 by various endpoints 103.

API security system 100 may then use (at 110) the modeled contextual relationships to differentiate between proper and improper usage of API 101. Specifically, API security system 100 may use (at 110) the modeled contextual relationships to determine if an endpoint 103 associated with one or more specific user context is calling and/or accessing data from a particular function in the intended manner specified by the one or more specific API context associated with that particular function. In some embodiments, an interface to API 101 may be configured to route or provide a copy of each function call made by an endpoint 103 to API security system 100 as well as a response provided by API 101 to each function call.

In response to detecting API usage by a particular endpoint 103 that violates a modeled contextual relationship or API usage that matches a modeled contextual relationship for improper API usage, API security system 100 may perform (at 112) the action defined for the policy or rule that is associated with that modeled contextual relationship. In some embodiments, performing (at 112) the action may include blocking, redirecting, and/or rewriting the function call. In some such embodiments, API security system 100 may modify the operation of the interface to API 101 or an agent process through which the calls to API 101 are made, and may cause the interface or the agent process to block, redirect, and/or rewrite the function call. In some embodiments, performing (at 112) the action may include generating one or more messages to notify different entities or to track the improper use of API 101.

Accordingly, API security system 100 does not simply inspect requests or function calls for signatures of malicious content or monitor the rate of requests in order to classify the requests as attacks or valid use of a particular API. API security system 100 also does not use the same conditions, signatures, and/or criteria to differentiate between attacks or valid use of different APIs.

Instead, API security system 100 may develop custom contextual relationship models for each API based on the unique API context and user context obtained for each API, and may enforce different rules and policies based on the custom contextual relationship models developed for each API. Consequently, the security provided for each API by API security system 100 may differ based on different API context and user context associated with each API, and based on different contextual relationships that are modeled from the associated API context and user context.

Figure 2:
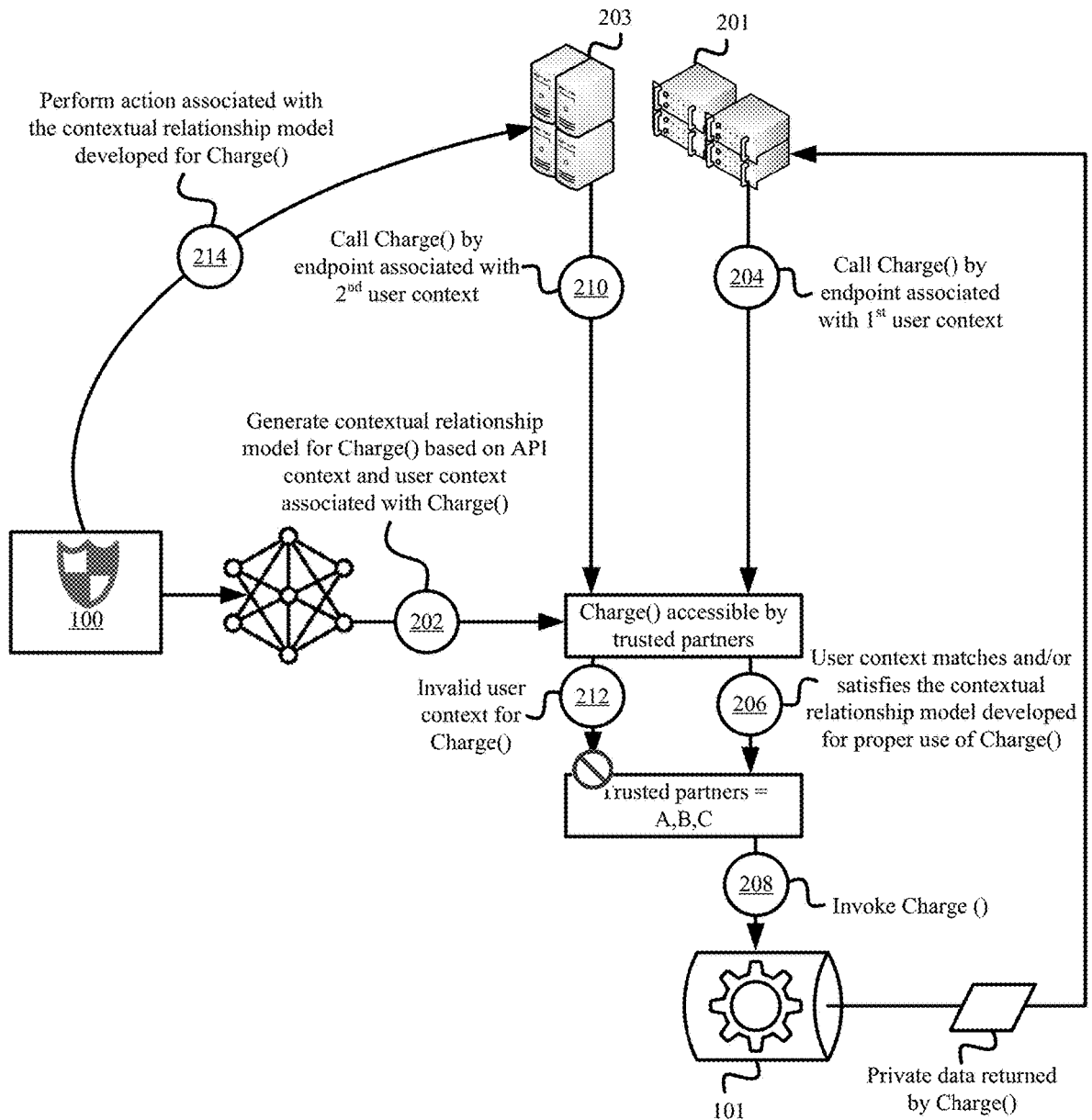
FIG. 2 illustrates an example of enforcing a rule or policy based on a modeled contextual relationship in accordance with some embodiments presented herein.

FIG. 2 illustrates an example of enforcing a rule or policy based on a modeled contextual relationship in accordance with some embodiments presented herein. As shown in FIG. 2, API security system 100 may generate (at 202) a contextual relationship model based on API context and user context obtained for API 101. In some embodiments, API security system 100 may generate (at 202) the contextual relationship model based on API context and user context that API security system 100 collects for different APIs and different endpoints accessing those APIs, and may modify and/or bias the contextual relationship model to prioritize the relationships that specifically apply to the API context of API 101 and the user context of endpoints 103 accessing API 101.

The contextual relationship model may include a first relationship that is established between a first API context and a second user context for proper use of a particular function of API 101. For instance, the first API context may specify that the particular function involves financial information, personally identifiable ("PII") data, confidential data, and/or other private data, and is therefore intended only for use and/or access by a trusted partner. The second user context may identify intent of different endpoints 201 and 203 accessing API 101 by mapping the network addressing of the different endpoints 201 and 203 to different entity types that include trusted and untrusted partners.

API security system 100 may examine calls made to the particular function using the contextual relationship model, and may determine if the intent of the endpoint calling the particular function, as determined from the user context associated with that endpoint, matches the intended use specified for the particular function in the API context associated with the particular function. As shown in FIG. 2, API security system 100 may receive (at 204) a first request to call the particular function from first endpoint 201. In some embodiments, an agent process may be installed on the interface to API 101, and may forward a copy of all requests to and responses from API 101 to network or cloud location of API security system 100.

Based on the Uniform Resource Locator ("URL") of the first request being directed to the particular function, API security system 100 may select the contextual relationships that are modeled for the particular function. Specifically, API security system 100 may identify the first API context associated with the particular function and the second user context that is linked to the first API context as a result of the modeling. API security system 100 may determine (at 206) that the intent behind first endpoint 201 calling the particular function matches and/or satisfies the intent specified for calling the particular function in API 101. Specifically, API security system 100 may determine (at 206) that the user context associated with first endpoint 201 matches and/or satisfies the first API context and the second user context that form the contextual relationship model developed for the particular function. Accordingly, API security system 100 may permit first endpoint 201 to invoke (at 208) and access the particular function.

API security system 100 may also receive (at 210) a second request to call the particular function that is issued by second endpoint 202. API security system 100 may select the contextual relationships that are modeled for the particular function based on the URL of the second request targeting the particular function. API security system 100 may determine (at 212) that the intent behind second endpoint 203 calling the particular function violates the intent specified for calling the particular function in API 101. Specifically, API security system 100 may determine (at 212) that the user context associated with second endpoint 203 corresponds to an endpoint that is not authorized to access the private data using the particular function, and therefore does not satisfy the API context and/or user context from the contextual relationship model developed for the particular function. Accordingly, API security system 100 may enforce (at 214) the rule or policy associated with the modeled contextual relationship. Enforcing (at 214) the rule or policy may include performing an action to block the second request, invoking a different function of API 101 that does not implicate the private data, and/or notifying various personnel of the improper usage of API 101. In some embodiments, enforcing (at 214) the rule or policy may include API security system 100 issuing a command from the cloud to the interface of API 101, and reconfiguring the interface to perform the action.

Figure 3:
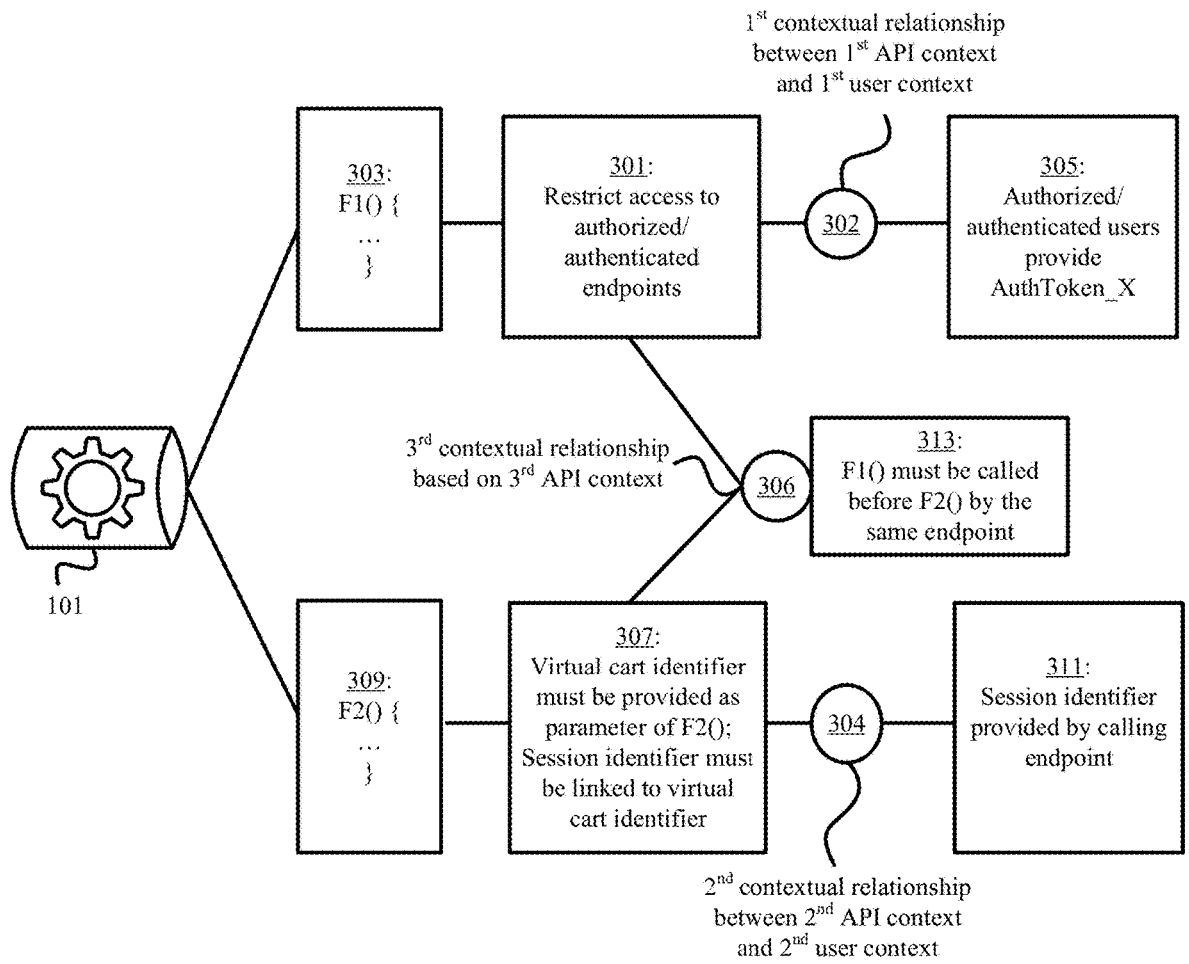
FIG. 3 illustrates an example of a complex contextual relationship in accordance with some embodiments presented herein.

API security system 100 may model complex contextual relationships that involve two or more different API contexts for two or more different API functions, and that further involve two or more different user contexts that are linked to the two or more different API contexts. FIG. 3 illustrates an example of a complex contextual relationship in accordance with some embodiments presented herein.

The complex contextual relationship may model proper usage of a set of functions from a particular API. The complex contextual relationship may include a first relationship that is established (at 302) between first API context 301, that is specified for first function 303 of API 101, and first user context 305. First API context 301 may prevent unauthorized or unauthenticated endpoints from accessing first function 303, and first user context 305 may identify authorized or authenticated endpoints based on a particular token being provided with a call of first function 303.

The complex contextual relationship may include a second relationship that is established (at 304) between second API context 307, that is specified for second function 309 of API 101, and second user context 311. Second API context 307 may specify that one or more parameters of second function 309 must include an identifier to a virtual shopping cart that is populated with one or more items and a session identifier that is linked to the virtual shopping cart identifier, and second user context 311 may include a session identifier associated with the endpoint calling second function 309.

The complex contextual relationship may include a third relationship that is established (at 306) with third API context 313. Third API context 313 may require first function 303 to be called before second function 309 by the same endpoint.

The complex contextual relationship illustrated in FIG. 3 may identify improper usage of API 101 based on an unauthorized or unauthenticated endpoint that calls second function 309 before calling first function 303. More specifically, the complex contextual relationship may be used to identify an entity that may be attempting to misappropriate data by repeatedly calling second function 309, hacking into API 101 via a perceived vulnerability in second function 309, and/or otherwise performing a malicious action that is identified based on the incorrect sequence with which the functions are called and the endpoint calling the functions without proper authorization or authentication. In other words, the complex contextual relationship illustrated in FIG. 3 may use multiple contextual relationships to identify anomalous access of API 101.

Additional API context and/or user context may be added to the complex contextual relationship to detect other potential misuses of API 101. For instance, the complex contextual relationship may include API context that determines misuse of API 101 when first function 303 or second function 309 provides a response that contains more than an allowed amount of data or when the cumulative amount of data returned to the same calling endpoint exceeds a certain amount. In this case, API security system 100 may protect API 101 from users that attempt to scrape or misappropriate data from API 101 despite the users issuing valid calls.

The modeled contextual relationships differentiate the operation of API security system 100 from other firewalls and network security devices. Specifically, the modeled contextual relationships customize the security and/or protections that API security system 100 implements for different APIs.

Figure 4:
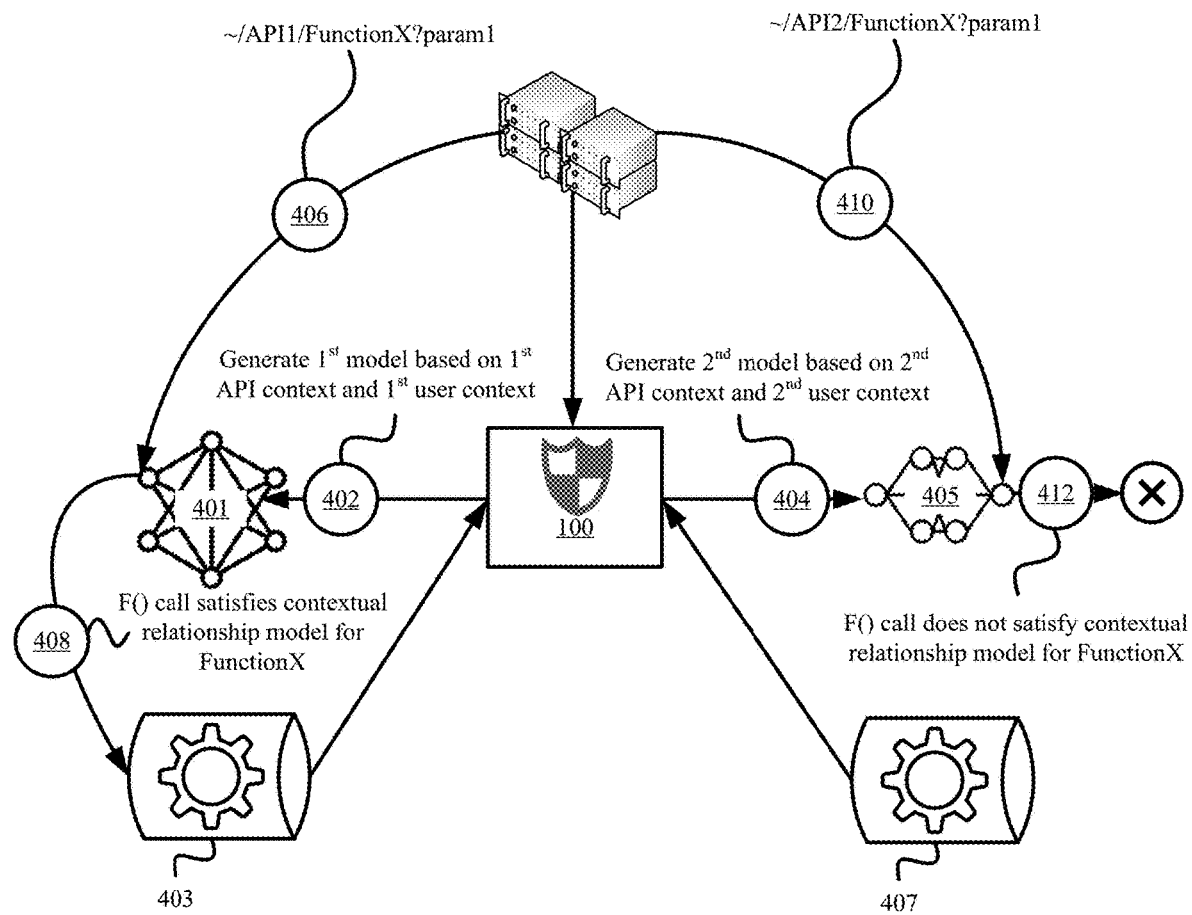
FIG. 4 illustrates an example of customizing API security for different APIs based on different models of contextual relationships that are generated from the API context and user context associated with each API in accordance with some embodiments presented herein.

FIG. 4 illustrates an example of customizing API security for different APIs based on different models of contextual relationships that are generated from the API context and user context associated with each API in accordance with some embodiments presented herein. As shown in FIG. 4, API security system 100 may include a cloud-based system that compiles API context and user context for different APIs in order to generate customized contextual relationship models for each API. Specifically, API security system 100 may generate (at 402) first model 401 of contextual relationships for first API 403 based on a first set of API context and user context associated with first API 403, and may generate (at 404) different second model 405 of contextual relationships for second API 407 based on a different second set of API context and user context associated with second API 407. First API 403 and second API 407 may include functions that have the same names and/or that are invoked using the same or similar calls.

API security system 100 may monitor proper and/or improper usage of first API 403 by different endpoints based on first model 401 of contextual relationships. The endpoints may issue (at 406) a first set of calls to a particular set of functions of first API 403 at a first time. API security system 100 may determine (at 408) that the user context associated with the endpoints and the API context associated with the first set of calls correspond to proper use of first API 403 based on first model 401 of contextual relationships. For instance, the user context may permit the endpoints to access specific services associated with the particular set of functions of first API 403, and the API context may permit calling the particular set of functions in a specified order with a specified set of parameters. Accordingly, API security system 100 may provide the first set of calls to first API 403 to invoke the called functions.

API security system 100 may monitor proper and/or improper usage of second API 407 by the same endpoints based on second model 405 of contextual relationships. The endpoints may issue (at 410) a second set of calls to the same particular set of functions of second API 407 at a second time. The second set of calls may mirror or match the first set of calls except that the second set of calls are issued to second API 407 rather than first API 403. API security system 100 may determine (at 412) that the user context associated with the endpoints may permit the endpoints to access the specific services associated with the particular set of functions of second API 407. However, the API context associated with second API 407 may not permit calling of the particular set of functions in the same specified order and/or with the same specified set of parameters as used to call the same functions of first API 403. In other words, the same function call from the same endpoint may correspond to proper use of first API 403, but improper use of second API 407 due to different contextual models 401 and 405 that are generated by API security system 100 based on different API context associated with each API 403 and 407. Accordingly, API security system 100 may enforce the policies and/or rules associated with second model 405 of contextual relationships, and may perform one or more actions in response to detecting the improper usage of second API 407.

Figure 5:
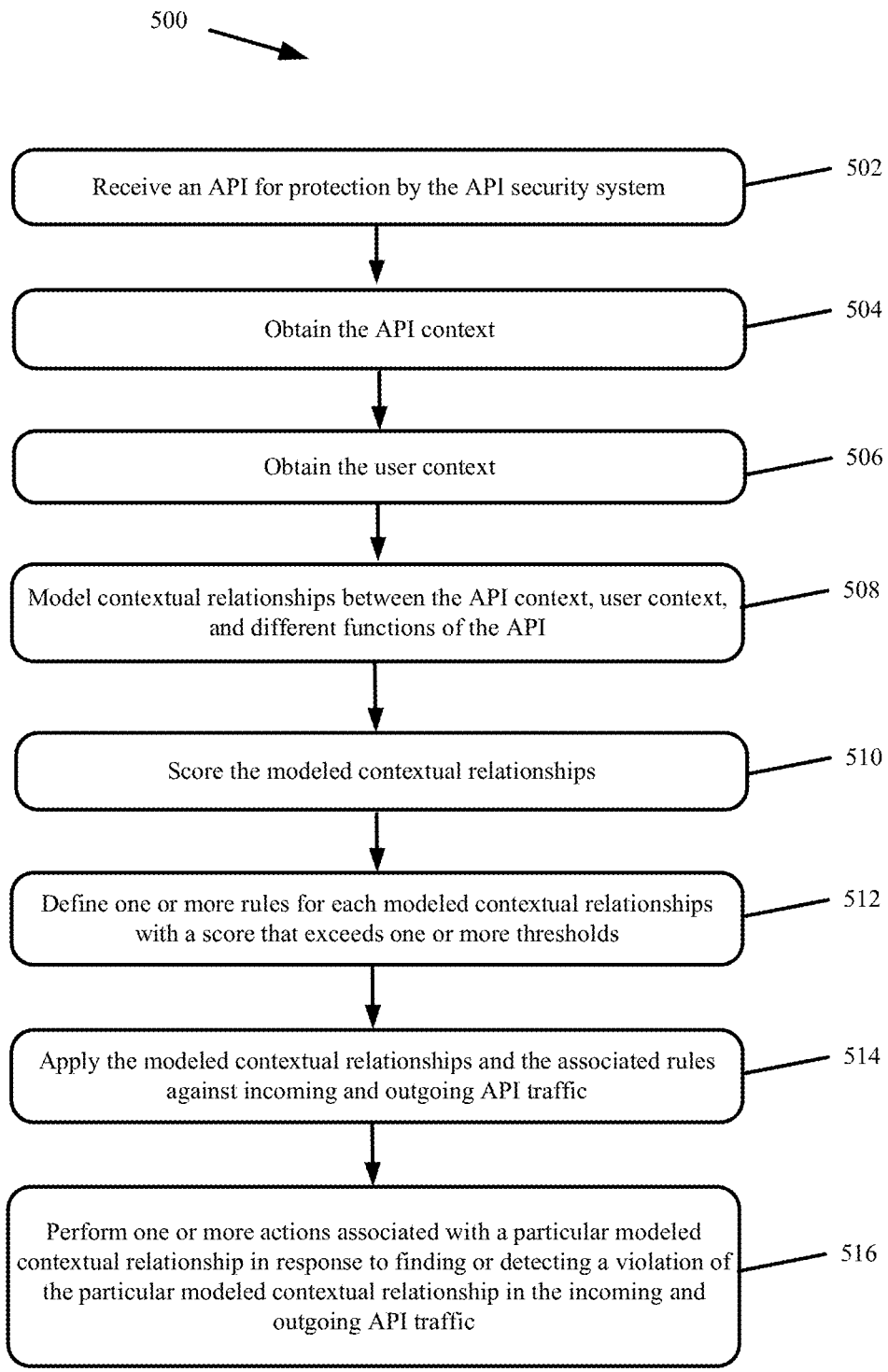
FIG. 5 presents a process for securing an API based on a modeling of contextual relationships within the API in accordance with some embodiments presented herein.

FIG. 5 presents a process 500 for securing an API based on a modeling of contextual relationships within the API in accordance with some embodiments presented herein. Process 500 may be implemented by API security system 100. In some embodiments, API security system 100 may be an appliance or device that is installed at a gateway used to reach the API, and/or that is configured to receive incoming and outgoing traffic between the API and different endpoints. In some embodiments, API security system 100 may be a cloud or centralized system that is configured to receive the incoming and outgoing traffic of the API. In some such embodiments, the routers, domain name system ("DNS") servers, and/or other network equipment may be configured to route requests directed to the network address, Uniform Resource Locator ("URL"), and/or other identifier of the API to API security system 100, and to route data returned by the API through API security system 100 before that data is routed to its intended endpoint. Alternatively, in some such embodiments, the interface or an agent process running at the interface of the API may be configured to provide a copy of requests and responses to and from the API to API security system 100.

Process 500 may include receiving (at 502) the API or access to the API that is to be protected by API security system 100. For instance, API security system 100 may be provided with a URL and/or security credentials to access or call functions of the API. In some embodiments, receiving (at 502) the API may include configuring the incoming and outgoing traffic of the API to flow through API security system 100 so that API security system 100 may detect any attacks or other improper use of API.

Process 500 may include obtaining (at 504) the API context. In some embodiments, the API developers or creators may document the intended purpose and/or usage of each API function, and may provide the documentation with the API context to API security system 100 for parsing and processing. In some embodiments, API security system 100 may be authorized to access the API source code from one or more repositories, and may scan the API source code to determine the intended purpose and/or usage of each function. For instance, the API source code may include comments or the function calls may include parameters that limit which endpoints may call and/or access the functions, what operations may be performed using the functions, a sequencing with which the functions are to be called, data that may be input and/or output from the API, acceptable sizes for requests used to call different functions, acceptable sizes of responses returned by called functions, and/or other conditions associated with the usage of the function calls. Accordingly, the API context may correspond to conditions or restrictions on who may call the API functions, how the API functions may be called (e.g., a call frequency, a call sequence or ordering, acceptable parameters, call formatting, etc.), and/or what data may be accessed (e.g., acceptable input and/or output data for each function). In some embodiments, the API context may be defined relative to the calling or invocation of a function, and/or the output produced by the function. For instance, the API context may specify that PII or private data may not be returned to a particular set of endpoints, output in a particular format may not be returned to endpoints with specific device types, output that exceeds a certain size, and/or a cycling through different output from repeated calls of the same function may not be returned to the same endpoint.

Process 500 may include obtaining (at 506) the user context. In some embodiments, API security system 100 may obtain (at 506) the user context from the API developers. In some embodiments, API security system 100 may obtain (at 506) the user context by monitoring and/or tracking endpoint behavior in calling or accessing the API functions and/or in performing other operations that may be unrelated to the API access. In some embodiments, API security system 100 may obtain (at 506) the user context from user profiles that may be stored in a database or other data repository.

The user context may identify the intent behind different endpoints accessing the API, wherein the intent may include the endpoint's purpose for accessing the API, endpoint needs, agreements that the endpoints have with the API, customers of the endpoints, etc. In some embodiments, the user context may map different addressing, header parameters, device types, and/or other identifiers to values that classify the endpoints, a relationship that the endpoints have with the API, credentials and/or accreditations of the endpoints, access privileges of the endpoints, and/or other intent of the endpoints accessing the API.

Process 500 may include modeling (at 508) contextual relationships between the API context, user context, and different functions of the API. In some embodiments, API security system 100 may use a neural network and/or AI/ML techniques to determine patterns, relationships, and/or commonality between the API context and user context for different API functions.

The neural network and/or AI/ML techniques may scan the API context that is associated with each function, and may pair or establish a link between the API context and the user context that satisfies or relates to the condition or restriction of the API context. For example, the API context may restrict a first function that accesses private data from being accessed by endpoints that are not financial institutions, payment processors, or a trusted partner, and the neural network may pair the API context with user context that differentiates endpoints as financial institution, payment processors, trusted partners, and/or other classifications. As another example, the API context may restrict calls to a second function that do not include a particular parameter or a specific format, and the neural network may pair the API context with user context that identifies a data format used by the endpoint. In some embodiments, modeling (at 508) the contextual relationships may include compiling different API context and/or user context that are obtained for a particular function, and generating a single model to verify the associated API context and user context when the particular function is called. In other words, the modeling (at 508) may include defining and/or using a complex multi-contextual relationship to more accurately detect improper usage of the API instead of using a single API content paired with a single user context to determine improper usage.

In some embodiments, the modeling (at 508) may include defining and/or using a complex multi-contextual relationship to determine different degrees of improper API usage and/or to differentiate the impact severity that different attacks may have on the API. For instance, a first request to call a particular function may violate first API context that is associated with the particular function but not second and third API context. The first request may therefore represent improper use that may have a minimal impact on the API. However, a second request to call the particular function may violate the first, second, and third API contexts, and may represent a more significant attack with greater potential impact to the API.

In some embodiments, the contextual relationships may be modeled (at 508) as a linked list of API context and/or user context, or may include establishing links to interconnect API context and/or user context from which proper and improper use of a function or set of functions may be determined. In other words, the linked list or links may identify a set of conditions (e.g., the API context) for calling one or more API functions, and endpoint parameters (e.g., the user context) for satisfying that set of conditions. In some embodiments, the contextual relationships may be modeled (at 508) as a relational graph or social network.

Process 500 may include scoring (at 510) the modeled contextual relationships. The scoring (at 510) may quantify the accuracy with which a modeled contextual relationship identifies misuse of the API, and/or may quantify the severity of the misuse. In some embodiments, the scoring (at 510) may be based on the API context and/or user context of the modeled contextual relationship. For instance, a modeled contextual relationship that involves financial, PII, and/or private or confidential data may be scored (at 510) higher than a modeled contextual relationship involving the sequence with which a set of functions are called. In some embodiments, the scoring (at 510) may be based on the number of different API context and/or user context included within a multi-contextual relationship model. More context in a model may more accurately differentiate between proper and improper use of the API, and may therefore be provided (at 510) a greater score than models defined with less context. In some embodiments, the scoring (at 510) may be based on prior usage of the API and tracking actions performed by the API developers or creators in response to different access patterns or usage of the API. For instance, a first modeled contextual relationship may permit a first set of endpoints to request specific functions at a high rate and a second set of endpoints to request the specific function at a low rate, and a second modeled contextual relationship may provide recognized API customers with access to PII data and may prevent unrecognized endpoints from accessing the PII data. API security system 100 may determine, based on the modeling (at 508), that the severity associated with a violation of the first modeled contextual relationship is less than a violation of the second modeled contextual relationship, and may score (at 510) the first and modeled contextual relationships accordingly.

Process 500 may include defining (at 512) one or more rules for each modeled contextual relationships with a score that exceeds one or more thresholds. Defining (at 512) the one or more rules may include defining one or more automated actions that API security system 100 performs in response to violations of a modeled contextual relationship. API security system 100 may select the one or more automated actions for the modeled contextual relationship based on the score, the API context, and/or the user context associated with that modeled contextual relationship. The higher the score, the more protective the action. For instance, a first modeled contextual relationship that is determined to be a low threat based on a low score may be associated with an automated action for notifying an API developer when that first modeled contextual relationship is found or violated. A second modeled contextual relationship that is determined to be a high threat based on a high score may be associated with an automated action for implementing a blocking rule that blocks an endpoint violating the second modeled contextual relationship from accessing or calling the corresponding functions.

Process 500 may include applying (at 514) the modeled contextual relationships and the associated rules against incoming and outgoing API traffic. Applying (at 514) the modeled contextual relationships and the associated rules may include configuring API security system 100 to inspect the incoming access requests and function calls made by different endpoints, and the outgoing data provided by the API in response to the requests and function calls using the modeled contextual relationships. Specifically, API security system 100 may compare a real-time usage of the API against the modeled contextual relationships.

Process 500 may include performing (at 516) the one or more actions associated with a particular modeled contextual relationship in response to finding or detecting a violation of the particular modeled contextual relationship in the incoming and outgoing API traffic. Specifically, API security system 100 may perform different actions based on different intentions of the endpoints accessing the API (e.g., the user context) violating the intended purpose or usage of the API as determined from the API context.

Figure 6:
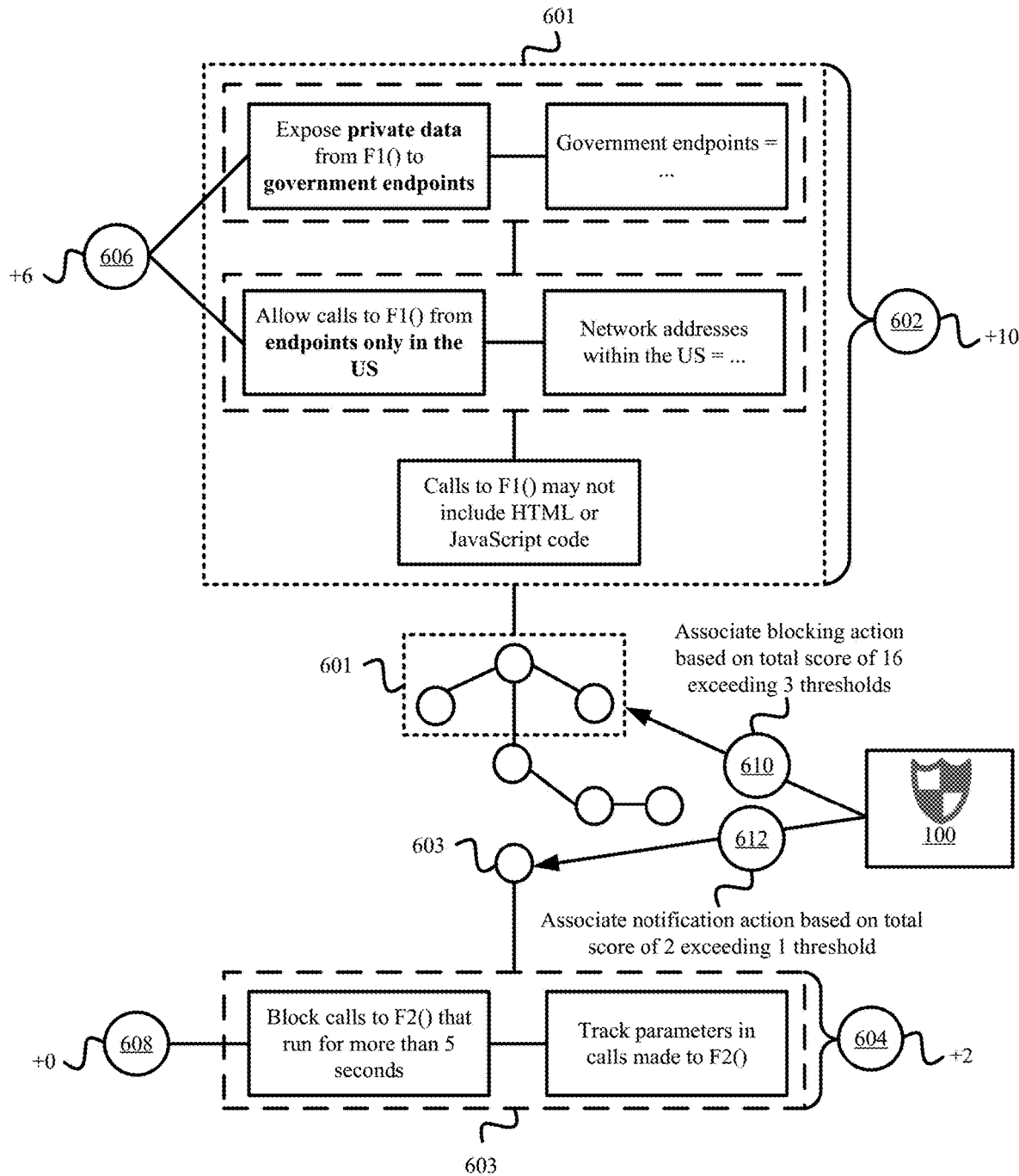
FIG. 6 illustrates an example for scoring the modeled contextual relationships in accordance with some embodiments presented herein.

FIG. 6 illustrates an example for scoring the modeled contextual relationships in accordance with some embodiments presented herein. FIG. 6 illustrates first and second modeled contextual relationships 601 and 603 that are generated for different functions of a particular API by API security system 100. First modeled contextual relationship 601 may include a combination of three API contexts and two different user contexts that the modeling determines to contribute to differentiating between proper and/or improper usage of a first function, and second modeled contextual relationship 603 may include a combination of a single API context and a single user context that the modeling determines to contribute to differentiating between proper and/or improper usage of a second function.

API security system 100 may determine that the additional context associated with first modeled contextual relationship 601 than second modeled contextual relationship 603 may be indicative of detecting API attacks, anomalous behavior, and/or other misuse with greater specificity and/or accuracy. In other words, there is a lesser chance of a false positive of API misuse being identified with first modeled contextual relationship 601 than with second modeled contextual relationship 603 due to the additional context used within first modeled contextual relationship 601 to differentiate between proper and/or improper use of the first function. Accordingly, API security system 100 may attribute (at 602) a greater first score to first modeled contextual relationship 601, and may attribute (at 604) a lesser second score to second modeled contextual relationship 603.

API security system 100 may determine that the API context and user context associated with first modeled contextual relationship 601 implicates important, sensitive, or private data, and that the API context and user context associated with second modeled contextual relationship 603 does not implicate important, sensitive, or private data. For instance, first modeled contextual relationship 601 may involve financial, PII, private, or confidential data, and second modeled contextual relationship 603 may not. Additionally, API security system 100 may determine that first modeled contextual relationship 601 may involve function calls that are not accessible by all endpoints, whereas the function calls of second modeled contextual relationship 603 are accessible by all endpoints. Accordingly, API security system 100 may attribute (at 606) a greater third score to first modeled contextual relationship 601, and may attribute (at 608) a lesser fourth score to second modeled contextual relationship 603 based on these and other scoring criteria.

API security system 100 may sum or total the scores computed for each modeled contextual relationship 601 and 603, and may determine if the total score exceeds one or more thresholds. API security system 100 may select one or more actions to associate with the modeled contextual relationship based on the total score, the API context, and/or the user context associated with that modeled contextual relationship. As shown in FIG. 6, API security system 100 may associate (at 610) and perform a restrictive blocking action to anomalous activity detected with first modeled contextual relationship 601 based on the cumulative score of first modeled contextual relationship 601 exceeding three thresholds, and may associate (at 612) and perform a less restrictive notification action to anomalous activity detected with second modeled contextual relationship 603 based on the cumulative score of second modeled contextual relationship 603 exceeding one of the three thresholds.

In some embodiments, the modeled contextual relationships may involve multiple function calls, a sequence of function calls, a rate at which different API functions are called by different endpoints, and/or other API usage state. Accordingly, API security system 100 may track the API usage state to compare against the multi-function modeled contextual relationships. In some embodiments, the API usage state to track may be defined as part of the user context for a modeled contextual relationship. For instance, the user state may specify tracking the identity of the endpoint calling different functions, a timestamp associated with each call, parameters used by that endpoint to call each of the different functions, and/or the type of data that is returned by the called functions.

Figure 7:
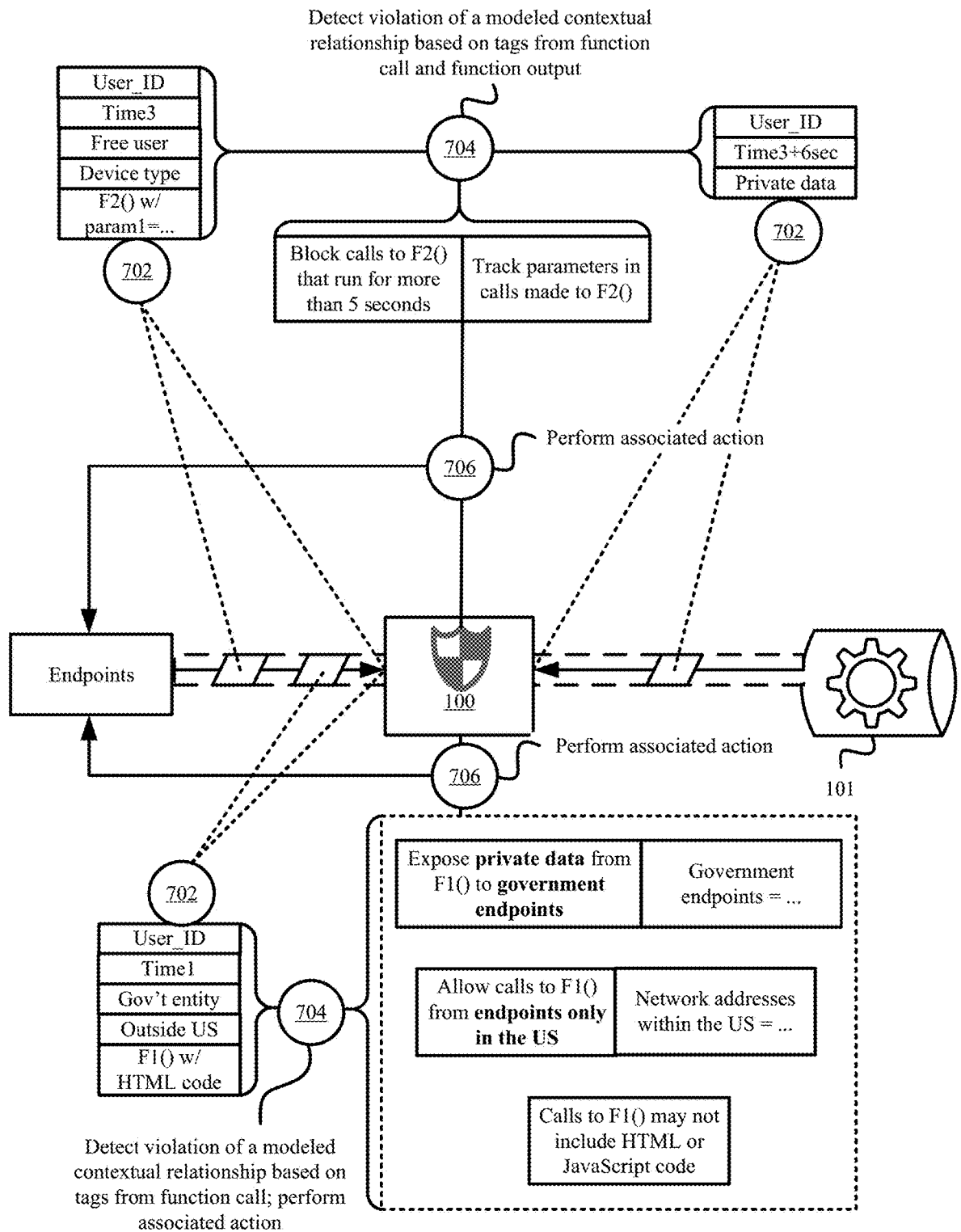
FIG. 7 illustrates an example of tracking API usage state and comparing the API usage state to the modeled contextual relationships in accordance with some embodiments presented herein.

FIG. 7 illustrates an example of API security system 100 tracking API usage state and comparing the API usage state to the modeled contextual relationships in accordance with some embodiments presented herein. As shown in FIG. 7, API security system 100 may be configured to receive incoming and outgoing traffic from API 101. Additionally, API security system 100 may be configured with a context table that identifies different tags for different API context or user context found in the incoming and outgoing traffic.

API security system 100 may inspect the incoming and outgoing traffic, and may associate (at 702) tags to each data packet for each user context or API context that is found in that data packet. For instance, a data packet sent by a particular endpoint or that is sent from API 101 and is intended for the particular endpoint may be tagged with one or more user context identifiers for any user context associated with that particular endpoint. Even if no user context is tracked for the particular endpoint, API security system 100 may tag the data packets with a user context identifier that identifies the particular endpoint based on the network address, device signature, and/or other unique identifier associated with the particular endpoint, and a timestamp. The data packets may also be tagged with one or more API context identifiers for any API context associated with a called API function and/or data that is returned by a called API function. For instance, a particular API function may be associated with PII data, and API security system 100 may tag the request to call the particular API function or output from the particular API function with a PII tag. In some embodiments, the tags may include parameters provided to call one or more functions.

API security system 100 may track API usage by recording the tags that are associated with the incoming and outgoing traffic. API security system 100 may compare (at 704) different combinations or subsets of the tags against the modeled contextual relationships to determine if a violation or misuse has occurred. In some embodiments, API security system 100 may obtain all tags associated with traffic sent or received by a particular endpoint or all tags associated with a particular called function or a set of functions, and may compare (at 704) the tags against the modeled contextual relationships to determine if the particular endpoint has misused the API. In some embodiments, API security system 100 may cycle through and select a different modeled contextual relationship on a periodic basis, may filter the recorded tags based on the API context and user context of a selected modeled contextual relationship, and may determine if a violation or misuse has occurred based on the recorded tags for the API context and user context of the selected modeled contextual relationship. In response to any detected anomalous activity that violates the modeled contextual relationships for proper usage of API 101, API security system 100 may perform (at 706) the actions associated with each modeled contextual relationship that is violated.

Figure 8:
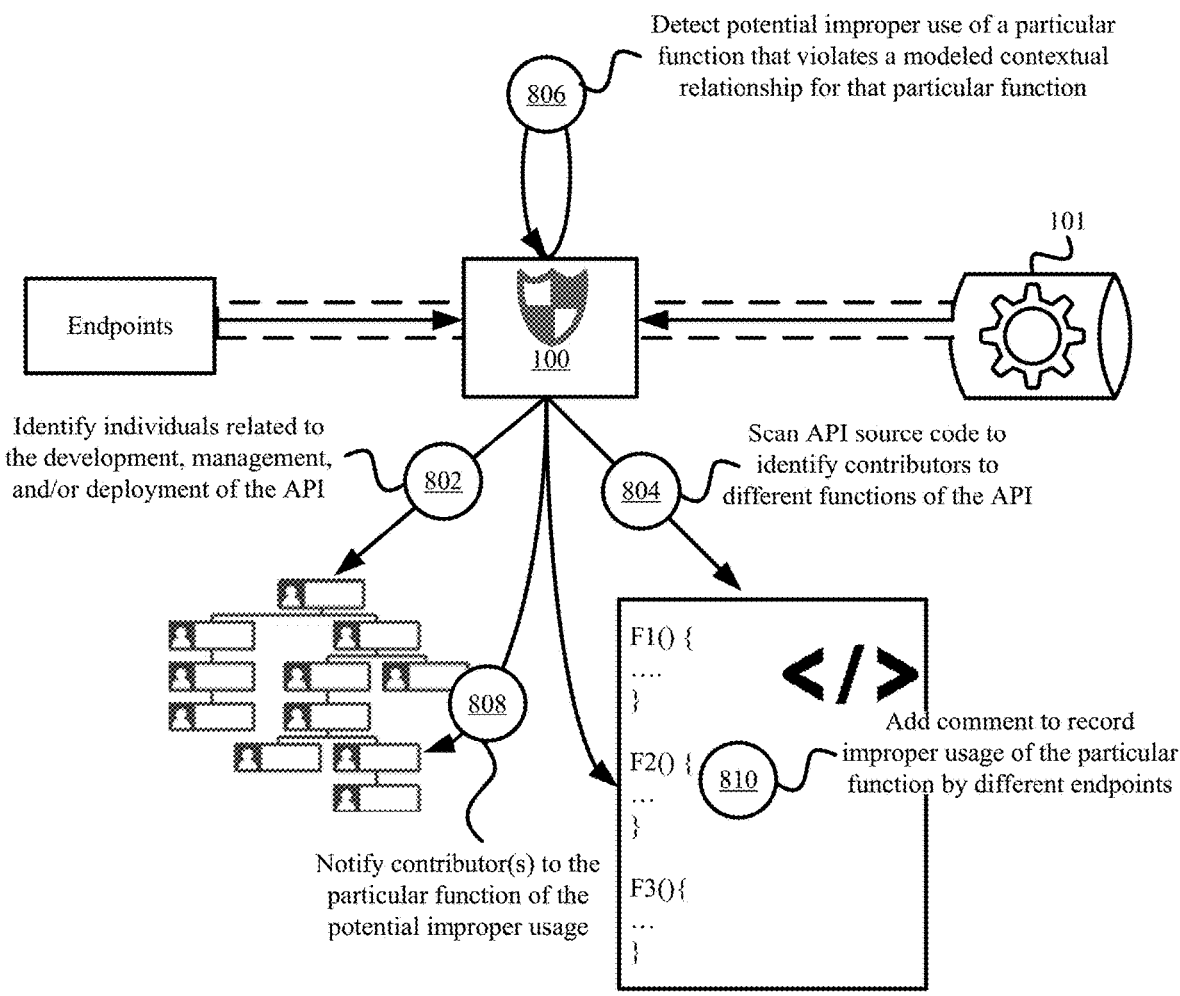
FIG. 8 illustrates an example of the customized actions for different modeled contextual relationships of an API in accordance with some embodiments presented herein.

In some embodiments, API security system 100 may customize the actions that it performs for different modeled contextual relationships of a particular API based on the organizational structure of the entity that generated the particular API. FIG. 8 illustrates an example of the customized actions for different modeled contextual relationships of API 101 in accordance with some embodiments presented herein.

API security system 100 may receive a request to secure and/or protect API 101 from misuse or attack. The request may provide API security system 100 with access to API 101 and/or the incoming and outgoing traffic of API 101.

API security system 100 may obtain (at 802) the organizational structure of the entity that generated API 101 from one or more sources. The organizational structure may identify individuals or teams in positions related to the development, management, and/or deployment of API 101. For instance, business organization charts and/or employee profiles posted online may identify personnel involved in the development and/or deployment of API 101. In some embodiments, API security system 100 may scan different sources to piece together the organizational structure of the entity based on organizational roles that API security system 100 identifies for different individuals or team members from the different sources.

In some embodiments, API security system 100 may have access to API 101 source code in one or more repositories. In some such embodiments, API security system 100 may scan (at 804) the source code and/or repository logs to identify individuals that wrote the code for different functions of API 101. For instance, the repository logs may track the last user or set of users that committed changes or modified source code for individual functions of API 101. Additionally, the source code may include comments that identify teams that contributed to different functions of API 101.

API security system 100 may detect (at 806) a potential misuse of a particular function from API 101 using a modeled contextual relationship for that particular function. The action associated with that modeled contextual relationship may include generating a custom notification to one or more individuals that contributed to the particular function. Accordingly, API security system 100 may generate (at 808) an email, text message, chat message, and/or other message to notify the one or more individuals that are identified in organizational structure and/or source code as having contributed to the particular function. The notification may include the tags for the API context and/or user context that violated the modeled contextual relationship for the particular function and/or identifiers for the responsible endpoints.

In some embodiments, API security system 100 may further customize the notification action based on the modeled contextual relationship, the associated API context, and/or the user context. For instance, API security system 100 may notify members of a development team when the modeled contextual relationship involves first API and/or user context, members of a testing team when the modeled contextual relationship involves second API and/or user context, members of a deployment team when the modeled contextual relationship involves third API and/or user context, and/or a particular executive or manager when the modeled contextual relationship involves fourth API and/or user context. Alternatively, API security system 100 may customize the notification action based on a severity or score associated with the modeled contextual relationship. For instance, API security system 100 may notify a first level support team when the severity or score associated with the modeled contextual relationship is less than a particular threshold, and may notify the developers responsible for the particular function when the severity or score associated with the modeled contextual relationship is more than the particular threshold. Accordingly, a modeled contextual relationship may be associated with an action, and API security system 100 may customize that action to target different endpoints or individuals based on the scores quantifying the importance of the context within the modeled contextual relationship.

In some embodiments, API security system 100 may add (at 810) comments or otherwise modify the source code of the particular function. API security system 100 may modify the source code to record any detected misuse of the particular function and/or identify the tags that caused the violation of the modeled contextual relationship. Accordingly, the source code may be updated with real-time statistics that developers may use to functions or code that are frequent targets of attack and/or that are most vulnerable.

Figure 9:
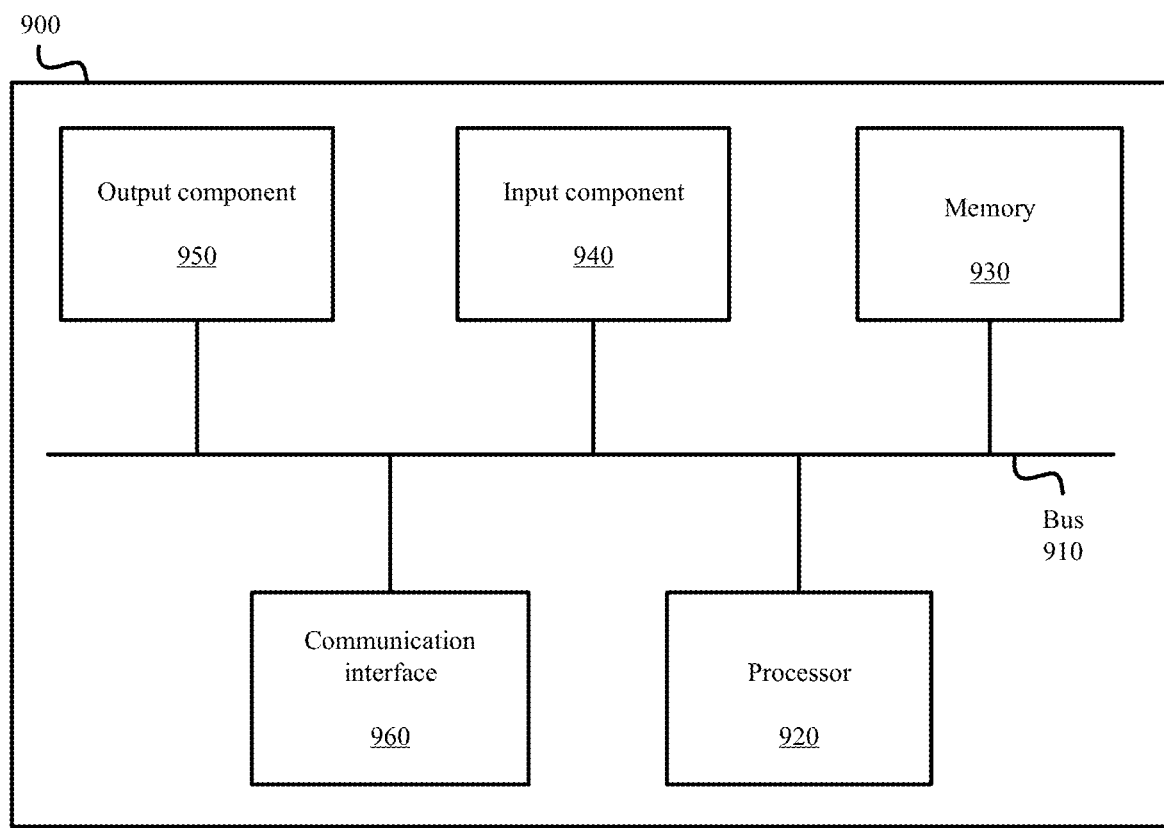
FIG. 9 illustrates example components of one or more devices, according to one or more embodiments described herein.

FIG. 9 is a diagram of example components of device 900. Device 900 may be used to implement one or more of the devices or systems described above (e.g., API security system 100, API 101, the endpoints, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving incoming traffic to and outgoing traffic from an application programming interface ("API") comprising a plurality of functions that are remotely accessed by a plurality of endpoints;
   generating tags for incoming packets from the plurality of endpoints to the API and for outgoing packets from the API to the plurality of endpoints based on different context associated with the incoming packets and the outgoing packets;
   comparing different sets of the tags against different modeled combinations of context that represent a proper or improper usage of the API;
   determining that a particular set of tags from the different sets of the tags corresponds to a modeled combination of context that represents an improper usage of the API; and
   securing the API from one or more endpoints associated with the particular set of tags.

2. The method of claim 1, wherein the incoming packets comprise requests to call different functions of the API, and wherein the outgoing packets comprise responses that the API generates in response to the requests to call the different functions.

3. The method of claim 2,
   wherein generating the tags comprises tracking a sequence with which the different functions of the API are called; and
   wherein determining that the particular set of tags corresponds to the modeled combination of context comprises determining that the sequence with which the different functions of the API are called in the particular set of tags corresponds to an improper access of the API.

4. The method of claim 1, wherein generating the tags comprises:
   tracking which functions of the API are called by which endpoints of the plurality of endpoints.

5. The method of claim 4, wherein determining that the particular set of tags from the different sets of the tags corresponds to the modeled combination of context comprises:
   determining that a particular endpoint from the plurality of endpoints calls functions of the API in an order that deviates from a modeled proper sequence of calling the functions.

6. The method of claim 1, wherein generating the tags comprises:
   tracking one or more of data or responses that the API generates for different endpoints of the plurality of endpoints.

7. The method of claim 1, wherein generating the tags comprises:
   defining the tags based on parameters that are included in the incoming traffic and that are issued with calls to different functions of the API.

8. The method of claim 7, wherein determining that the particular set of tags from the different sets of the tags corresponds to the modeled combination of context comprises:
   determining that the parameters used to call one or more functions of the API deviate from modeled parameters for the one or more functions.

9. The method of claim 1, wherein comparing the different sets of the tags comprises:
   selecting different combinations of tags associated with a particular endpoint accessing the API or different endpoints of the plurality of endpoints accessing a particular set of functions from the API.

10. The method of claim 9, wherein selecting the different combinations of tags comprises:
    selecting a combination of tags that are generated for the particular endpoint calling different functions of the API and responses that the API generates in response to the particular endpoint calling the different functions.

11. The method of claim 9, wherein selecting the different combinations of tags comprises:
    selecting a combination of tags that are generated from the plurality of endpoints calling a particular function of the API.

12. The method of claim 1, wherein determining that the particular set of tags from the different sets of the tags corresponds to the modeled combination of context comprises:
    determining that a rate at which one or more functions of the API are called exceeds a modeled proper rate of calling the one or more functions.

13. The method of claim 1 further comprising:
    defining the modeled combination of context that represents the improper usage of the API based on the modeled combination of context that represents the improper usage of the API differing from combinations of context that are associated with a threshold number of proper API accesses.

14. The method of claim 1 further comprising:
defining the modeled combination of context that represents the improper usage of the API based on the modeled combination of context that represents the improper usage of the API accessing one or more functions of the API differently than combinations of context with which a threshold number of endpoints access the one or more functions.

15. The method of claim 1 further comprising:
defining the modeled combination of context that represents the improper usage of the API based on the modeled combination of context that represents the improper usage of the API corresponding to a sequence of API access that deviates from a modeled sequence of API access by a threshold percentage of endpoints.

16. The method of claim 1 further comprising:
defining the modeled combination of context that represents the improper usage of the API based on the modeled combination of context that represents the improper usage of the API corresponding to a sequence of API access that deviates from a modeled sequence of API access that is specified by developers of the API.

17. The method of claim 1, wherein securing the API comprises:
preventing the one or more endpoints associated with the modeled combination of context from accessing the API.

18. The method of claim 1, wherein securing the API comprises:
restricting data that the API returns in the outgoing traffic associated with the modeled combination of context.

19. A system comprising:
one or more hardware processors configured to:
receive incoming traffic to and outgoing traffic from an application programming interface ("API") comprising a plurality of functions that are remotely accessed by a plurality of endpoints;
generate tags for incoming packets from the plurality of endpoints to the API and for outgoing packets from the API to the plurality of endpoints based on different context associated with the incoming packets and the outgoing packets;
compare different sets of the tags against different modeled combinations of context that represent a proper or improper usage of the API;
determine that a particular set of tags from the different sets of the tags corresponds to a modeled combination of context that represents an improper usage of the API; and
secure the API from one or more endpoints associated with the particular set of tags.

20. A non-transitory computer-readable medium storing instructions that, when executed by one or more processors of an application programming interface ("API") security system, cause the API security system to perform operations comprising:
receiving incoming traffic to and outgoing traffic from an API comprising a plurality of functions that are remotely accessed by a plurality of endpoints;
generating tags for incoming packets from the plurality of endpoints to the API and for outgoing packets from the API to the plurality of endpoints based on different context associated with the incoming packets and the outgoing packets;
comparing different sets of the tags against different modeled combinations of context that represent a proper or improper usage of the API;
determining that a particular set of tags from the different sets of the tags corresponds to a modeled combination of context that represents an improper usage of the API; and
securing the API from one or more endpoints associated with the particular set of tags.

* * * * *